United States Patent [19]

Yoshida

[11] Patent Number: 4,930,370
[45] Date of Patent: Jun. 5, 1990

[54] MIRROR DRIVE FOR AUTOMOTIVE REMOTE-CONTROLLED REAR-VIEW MIRROR ASSEMBLY

[75] Inventor: Norio Yoshida, Isehara, Japan

[73] Assignee: Ichikoh Industries, Ltd., Tokyo, Japan

[21] Appl. No.: 345,704

[22] PCT Filed: Aug. 17, 1988

[86] PCT No.: PCT/JP88/00812
§ 371 Date: May 25, 1989
§ 102(e) Date: May 25, 1989

[87] PCT Pub. No.: WO89/01426
PCT Pub. Date: Feb. 23, 1989

[30] Foreign Application Priority Data

Aug. 18, 1987 [JP] Japan .................. 62-124813

[51] Int. Cl.[5] ............ F16C 1/10; B60R 1/06; G02B 7/18
[52] U.S. Cl. .................. 74/502.1; 350/633; 350/634
[58] Field of Search ............ 74/502.1, 47 G, 424.8 R; 350/636, 531, 637, 633, 634; 248/487

[56] References Cited

U.S. PATENT DOCUMENTS

| 4,158,483 | 6/1979 | Fisher et al. ............ 350/633 |
| 4,286,841 | 9/1981 | Deshaw .................. 350/636 |
| 4,494,420 | 1/1985 | Sakuma .................. 74/479 |
| 4,504,116 | 3/1985 | Sharp .................... 350/637 |
| 4,611,501 | 9/1986 | Brown .................... 74/502.1 |
| 4,678,295 | 7/1987 | Fisher ................... 350/634 |
| 4,740,068 | 4/1988 | Fisher ................... 350/634 |
| 4,770,522 | 9/1988 | Alten .................... 350/633 |
| 4,815,837 | 3/1989 | Kikuchi et al. .......... 350/637 |
| 4,824,232 | 4/1989 | Thompson ................ 350/633 |

FOREIGN PATENT DOCUMENTS

| 2846586 | 5/1980 | Fed. Rep. of Germany ...... 350/636 |
| 61-204845 | 12/1986 | Japan ................... 74/502.1 |

Primary Examiner—Vinh T. Luong
Attorney, Agent, or Firm—Foley & Lardner, Schwartz, Jeffery, Schwaab, Mack, Blumenthal & Evans

[57] ABSTRACT

The mirror drive for remote-controlled rear-view mirror assembly includes an air-tight container housing two motors to drive the horizontal and vertical turns of the mirror and which is composed of two synthetic resin-made casings which are closely attached to each other. Plural conductive plates which electrically connect terminals of the two motors to external terminals outside the airtight containers are previously buried in an insulative block with both ends there being exposed outside of the block. The insulative block covers the opening formed in the lateral wall of either of the casings and is secured to the lateral wall of the casing. Of the exposed ends of the plural conductive plates, those ones which are connected to the terminals of the motor are located inside the casings, while the other ends which are connected to the external connectors are led out through the opening in the casing.

6 Claims, 5 Drawing Sheets

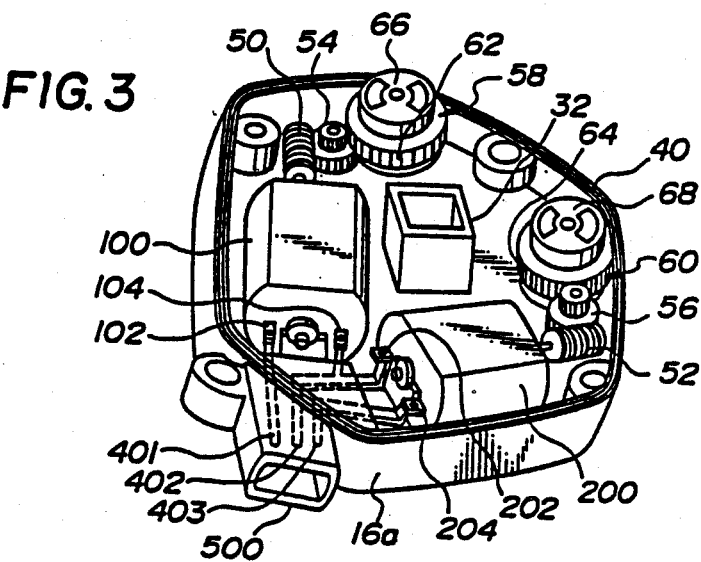
FIG. 3
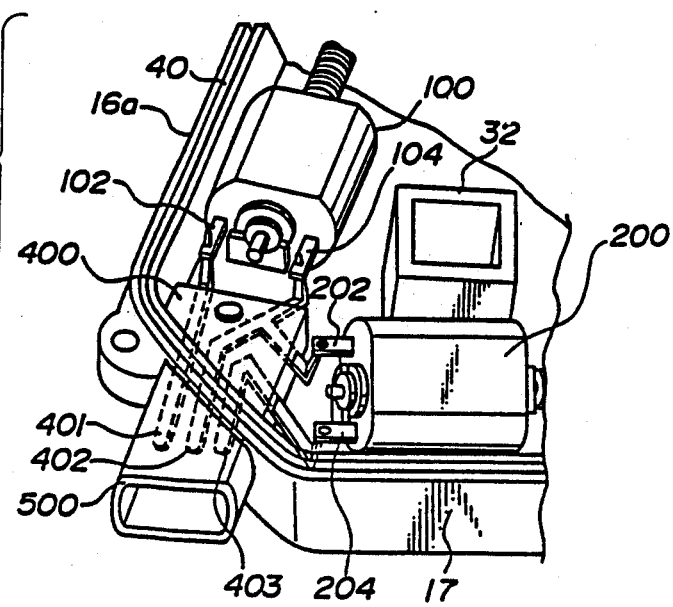
FIG. 4
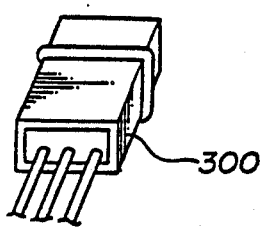

MIRROR DRIVE FOR AUTOMOTIVE REMOTE-CONTROLLED REAR-VIEW MIRROR ASSEMBLY

FIELD OF THE INVENTION

The present invention relates to a mirror drive for use in an automotive remote-controlled rear-view mirror, and more particularly to an electrical connection structure enclosed in a power unit casing and which supplies power to two motors which drive the horizontal and vertical turns of the mirror.

DESCRIPTION OF THE PRIOR ART

In the automotive remote-controlled rear-view mirror assembly, a mirror is disposed changeably in direction in an opening in a mirror housing, and a mirror drive to drive the mirror is designed in the form of a power unit casing fixed inside the mirror housing. The power unit casing consists of two insulative parts, upper and lower, and has two motors disposed therein. Generally, the power unit casing is made waterproof by interposing an O-ring, or applying a sealant, between the junction surfaces of the upper and lower subcasings. The motors are so electrically connected at the terminals thereof to the battery and control switch that the mirror is turned horizontally and vertically by running the two motors in the casing forwardly or reversely as desired. Normally, the terminals of these motors have connected thereto sheathed wires which are led out of the mirror assembly through lead-out ports formed in the casing. In such conventional electrical connection structure, there is between each sheathed wires and wire lead-out ports gaps through which rain or the like possibly enters into the casing. To prevent such rain or the like from entering into the casing, a remote-controlled rear-view mirror assembly has been proposed which has a casing molded integrally with plural electrically conductive plates of which ends are so placed inside the casing as to be connected to the terminals of each motor while the other ends are so exposed outside the casing as to electrically be connected to the battery and control switch. A remote-controlled rear-view mirror assembly is disclosed in, for example, in the Japanese Unexamined Utility Model Publication No. 61-204845 (laid open on Dec. 12, 1986). For integral molding of the casing and plural conductive plates, the latter are inserted at one end thereof in vertical recess formed in the movable mold and the other end of the conductive plate is moved toward the vertical recess formed in the stationary mold opposite to the movable mold and thus the other end of each conductive plate is inserted into the vertical recess in the stationary mold, whereby the plural conductive plates are positioned. In such condition, a resin is injected into the clearance between the movable and stationary molds, whereby each conductive plate is molded integrally with the casing. For molding such conventional improved electrical connection structure, one end of each conductive plate is inserted in the vertical recess formed in the movable mold and the other end is moved toward the vertical recess formed in the stationary mold. So much care must be taken for controlling the positioning of the conductive plates, and the controlling is very difficult. Namely, if the other ends of the conductive plates are not inserted together into the vertical recess formed in the stationary mold, some of the conductive plates will be so bent that the other ends of the conductive plates which are to be exposed out of the casing to a predetermined length will not be correctly exposed so, with the result that the molding yield of the power unit casing will be low. In other such electrical connection structure, the edge of the vertical recesses in the movable and stationary molds are tapered for easy insertion of the ends of the conductive plates. When molding the power unit casing, a synthetic resin flows to the edges of the vertical recesses in the movable and stationary molds. As a result, a set synthetic resin will reside at the portions exposed out of the casing of the conductive plates molded integrally with the casing, and particularly the exposed portions of the conductive plates outside the casing provide for connections with an external connector and so the synthetic resin residing on the connections will block the insertion of such external connector. The aforementioned electrical connection structure is such that the ends of the conductive plates are exposed out of the casing bottom. Therefore, the direction of the conductive plates must be the same as the moving direction of the movable mold, that is, the ejecting direction of the mold. This electrical connection structure having the conductive plate ends exposed out of the casing bottom is advantageous when it is adopted in a power unit casing which is to be fixed inside a shell-type mirror housing having a sufficient depth such as the fender mirror assembly. However, for use in a so-called door mirror assembly employing a thin mirror housing, the power unit casing is also to be thin, and in such door mirror assembly, the power unit casing is usually fixed with the rear side of the casing secured to a bracket disposed on the mirror housing. Therefore, the sheathed wires connected to the terminals of the two motors are usually led out from the insertion hole formed in the lateral side of the casing; so it is difficult from the viewpoint of the ejecting direction of the mold to apply the aforementioned well-known electrical connection structure to the power unit of the door mirror assembly.

The present invention has a primary object to overcome the above-mentioned drawbacks of the conventional techniques by providing a mirror drive for use in a remote-controlled rear-view mirror assembly, having an electrical connection structure for connection to two motors inside a power unit casing and which is highly waterproof and easy to assemble.

The present invention has another object to provide a mirror drive for use in a remote-controlled rear-view mirror assembly, having an electrical connection structure preferably usable in a door mirror assembly including a thin power unit casing corresponding to a thin mirror housing.

The present invention has a yet another object to prove a mirror drive for use in a remote-controlled rear-view mirror assembly having an electrical connection structure for connection to two motors inside a power unit casing, which can be integrally molded with an improved yield and without any residual synthetic resin on the exposed portions of conductive plates used therein.

SUMMARY OF THE INVENTION

The above objects are attained by providing a mirror drive for use in a remote-controlled rear-view mirror assembly, comprising, according to the present invention, two motors to drive the horizontal and vertical turns of a mirror pivotably supported in a mirror housing, an airtight container housing the two motors and consisting of two synthetic resin-made casings which are closely attached to each other, gear means disposed in the airtight container and which decelerate the rotation of the output shafts of the two motors, means engaged with the gear means to convert the rotary motion of the gear means into a substantial linear motion and also projected out of the airtight container to transmit the linear motion to the mirror, and means for electrically connecting terminals of the two motors to external connectors outside the airtight container, the electrical connecting means being composed of an insulative block secured to the lateral wall of either of the casings of the airtight container and which covers an opening formed in the lateral wall, and a plurality of electrically conductive plates previously buried in the insulative block, each being at one end thereof electrically connected to a corresponding terminal of the two motors while the other end is led out through the opening formed in the casing. Since the plurality of conductive plates electrically connected to the respective terminals of the two motors are previously buried in the insulative block and this insulative block is secured covering the opening in such a manner that the other ends of the plural conductive plates are led out through the opening in the casing, the waterproofness of the airtight container is improved and the power-supply wiring of the two motors to the terminals is unnecessitated so that the mirror drive can be easily mounted into the rearview mirror assembly. Also since the plural conductive plates are so configured as to be led out of the lateral wall of the casing, a mirror drive can be provided which is suitably usable in a remote-controlled door mirror assembly having a mirror housing which is of small depth, namely, thin.

Furthermore, in the molding process of either of the casings of the airtight container, the insulative block in which the plural conductive plates are previously buried with both ends thereof being exposed outside can be integrally molded in such a manner that the lateral side of the insulative block at which the other ends of the insulative plates are exposed forms the lateral side of the casing. The advantages of the integral molding, in the molding process of the casings, of the insulative block in which the plural conductive plates are previously buried are the improved yield of the molding, no residual synthetic resin on the exposed portions of the conductive plates and thus no adverse affect to the connection with external connectors since the insulative block can be securely immobilized between a stationary and movable molds so that the conventional positioning by inserting the ends of thin conductive plates into the recesses in the stationary and movable molds is unnecessitated.

These and other objects and advantages of the present invention will be better understood from the ensuing description made, by way of example, of the embodiments of the mirror drive for remote-controlled rear-view mirror assembly according to the present invention with reference to the drawings.

BRIEF DESCRIPTION OF THE DRAWINGS

FIG. 3 is a perspective view showing the inside of the power unit with one of the two casings forming the power unit removed;

FIG. 4 is a perspective view, enlarged in scale, of the essential portion of the power unit in FIG. 3;

DESCRIPTION OF THE PREFERRED EMBODIMENTS

Figure 1:
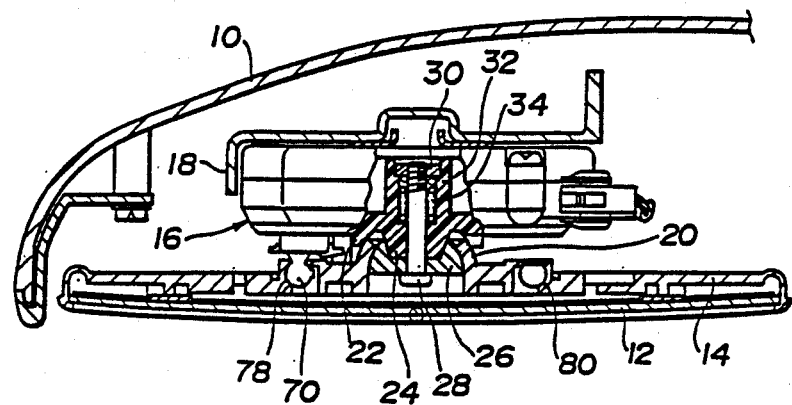
FIG. 1 is a sectional view showing one embodiment of the mirror drive for remote-controlled rear-view mirror assembly according to the present invention, which is applied to a door mirror, with a portion omitted.
Figure 2:
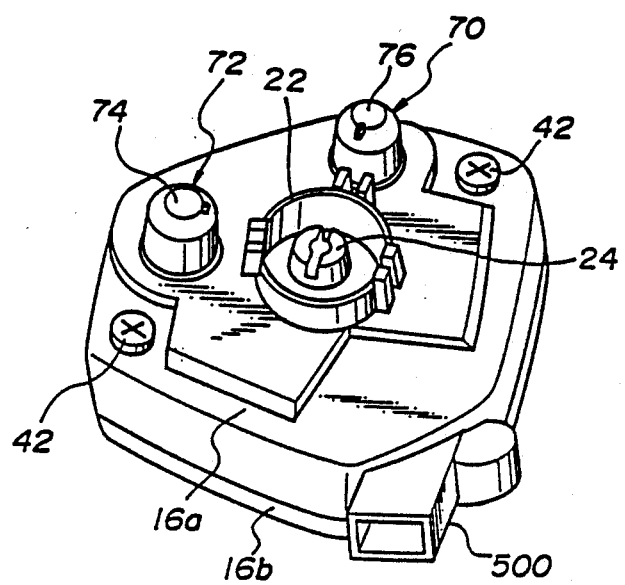
FIG. 2 is a perspective view showing the entire power unit composing the mirror drive.
Figure 5:
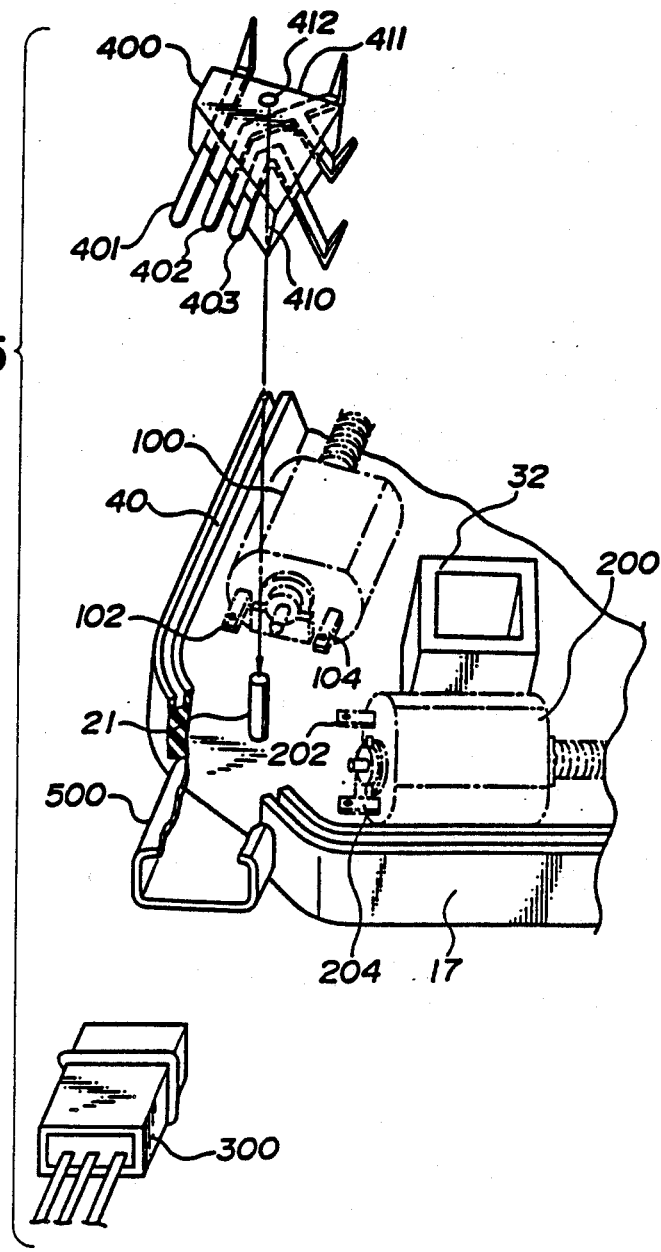
FIG. 5 is an explanatory drawing showing the installation to the casings of the insulative block in which the plural conductive plates are previously buried.
Figure 6:
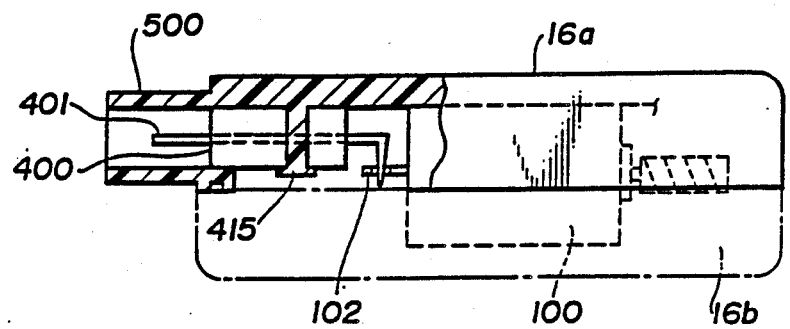
FIG. 6 is a schematic view showing the state of the insulative block installed to the casings.

Referring now to FIG. 1, the internal structure of the remote-controlled rear-view mirror is illustrated which has a mirror housing 10 mounted to a mirror base (not shown) which is to be fixed on the door of a car. A mirror 12 is disposed as fixed to a mirror body 14, covering the opening of the mirror housing 10. The reference numeral 16 indicates a mirror drive unit, namely, a power unit, disposed as fixed by means of a bracket 18 inside the mirror housing. This power unit 16 is so constructed as to be capable of turning the mirror body 16 horizontally or vertically under the remote-control by the control switch located around the driver's seat.

The mirror body 14 is pivotably supported with respect to the power unit 16. The power unit 16 comprises two synthetic resin-made casings 16a and 16b which house two motors 100 and 200 and are so shaped as to be closely attached to each other. The mirror body 14 is supported by a means including a pivot junction consisting of a hollow, semispheric member 20 formed near the center of the rear side of the mirror body 14 and a semispheric seat member 22 formed on the surface of the casing 16a opposite to the semispheric member 20. The seat member 22 has disposed integrally therewith at the center thereof a conical protrusion 24 having a through-hole formed coaxially with the pivot of the pivot junction On the other hand, the semispheric member 20 has disposed in the bore therein a pressing member 26 formed so as to fit the inner wall of the bore. The pressing member 26 has formed at the center thereof a through-hole coaxial with, and also of a nearly same diameter as, the one formed in the protrusion 24. These through-holes have introduced therein bolts 28 of which the heads are in contact with the flat portion of the pressing member 26 while the external thread portion of the bolts 28 are screwed in the square nuts 30 located inside the casing 16a. The nut 30 is disposed as checked against any rotation within a cylindrical portion 32 having a square section and which is integrally molded inside the casing 16a, and there is fitted in the cylindrical portion 32 a coil spring 34 which presses the nut 30 toward the casing 16b. Therefore, the semispheric member 20 of the mirror body 14 can be appropriately forced to the seat member 22 by means of the pressing member 26, and supported pivotably with respect to the power unit 16. The structure per se of such pivot junction is well known, and so it will not be described in further detail.

As will be seen in FIG. 3, there is formed at the joining boundary between the casings 16a and 16b a recess 40 in which an O-ring (not shown) is disposed. These two casings 16a and 16b are coupled to each other by means of screwing members 42. The rotation of the two motors 100 and 200 housed in such casings is transmitted to drive gear mechanisms 58 and 60, respectively, through reduction gears 54 and 56 including worms 50 and 52, respectively, fixed to the output shafts of the motors 100 and 200, respectively. The drive gear mechanisms 58 and 60 have formed on the outer circumferences of cylindrical members thereof gears 62 and 64, respectively, which are in mesh with the reduction gears 54 and 56, respectively, and pawl-shaped elastic pieces (not shown) at the ends of the cylindrical members. Rotary members 66 and 68 each having a pair of elastic arm members (not shown) extending inwardly of the cylindrical members are fixed to the cylindrical members rotatably therewith. The reference numerals 70 and 72 indicate actuating members, respectively, which turn the mirror body 14 horizontally and vertically, respectively. The actuating members 70 and 72 have balls 74 and 76, respectively, formed at the ends thereof, and also small cylindrical portions (not shown) which can be inserted into the cylindrical members, respectively, composing the drive gear mechanisms 58 and 60. The cylindrical portion has formed on the inner circumference thereof an internal thread portion (not shown) into which the aforementioned pawl-shaped elastic piece. The balls 74 and 76 are fitted in spherical seats 78 and 80 formed on the rear side of the mirror body 14 as checked against any rotation. Therefore, as the gear 62 or 64 is rotated, the rotary member 66 or 68 rotates along with the pair of elastic arm members and the pawl-shaped elastic piece on each elastic arm member rotates as engaged in the internal thread portion formed on the inner circumference of the actuating member 70 or 72, so that the actuating member 70 or 72 checked against any rotation will move forward or backward according to the running direction of the motor 100 or 200, whereby the mirror body 14 will be turned horizontally or vertically.

In this embodiment in which the mirror drive according to the present invention is applied to a door mirror, terminals 102 and 104, and 204 and 204 of the motors 100 and 200, respectively, are electrically connected to a connector 300 electrically connected to a remote-control switch located around the driver's seat and the battery by means of three electrically conductive plates 401, 402 and 403 buried in a synthetic resin-made insulative block 400. The terminal 102 is connected to the conductive plate 401, the terminals 104 and 202 are connected to the conductive plate 402, and the terminal 204 is connected to the conductive plate 403. These conductive plates 401, 402 and 403 are integrally formed in the molding process of the insulative block 400, and the one exposed end of each conductive plate is so shaped to have a shape edge as to be engageable into the small hole formed in each terminal of the motors 100 and 200 while the other end is so shaped as to be engaged with a corresponding terminal of the connector 300. The other end of each conductive plate which is to be connected to the connector 300 is exposed out of an end face 410 of the insulative block 400, and the end face 410 is closely secured to the inner circumferential edge of the opening formed in the lateral wall 17 of the casing 16a and thus covers the opening. The exposed end of each conductive plate is exposed out of the casing from the opening and connected to the connector 300. The reference numeral 500 indicates a socket formed as protruded outwardly of the outer circumferential edge of the opening formed in the lateral wall 17 of the casing 16a, and it is so constructed that when the connector 300 is fully inserted the exposed ends of the conductive plates are electrically connected to the corresponding terminals of the connector 300.

When assembling the aforementioned insulative block 400 into the casing 16a, the insulative block 400 lowers down to the bottom of the casing 16a owing to its own weight as guided by the pin 21 by lowering the insulative block 400 as somehow slanted until the exposed end of each conductive plate is exposed outside the casing through the opening formed in the lateral side 17 of the casing 16a and fitting thereafter the pin 21 formed on and integrally with the casing 16a into the small hole 412 formed in the insulative block 400. Then, the insulative block 400 is positioned as slightly rotated around the pin 21 until the end face 410 of the insulative block 400 touches the lateral wall 17 of the casing 16a. Thereafter, the insulative block 400 is fixed to the casing 16a by thermally calking the apex of the pin 21. Further, when a sealant which also serves as adhesive, applied to the junction between the end face 410 of the insulative block 400 and the lateral wall 17 of the casing 16a from the side of the socket 500 is hardened, the assembling of the insulative block 400 into the casing 16a is complete.

When the assembling of the insulative block 400 into the casing 16a is over, the motors 100 and 200 can easily be connected electrically to the external connector 300 by fitting the sharp ends of the conductive plates 401, 402 and 403 into the small holes in the ends of the terminals 102 and 104 and 202 and 204. Thus, the electrical connection between the two motors 100 and 200 disposed inside the sealed container formed by the casings 16a and 16b and the connector 300 outside the container needs no manual disposition and connection of plural wires which would be required in the conventional mirror assembly. The intended purpose can easily be attained owing to the disposition of the insulative block 400 having buried therein the conductive plates 401, 402 and 403 molded integrally therewith and the disposition at predetermined positions of the two motors 100 and 200.

Figure 7:
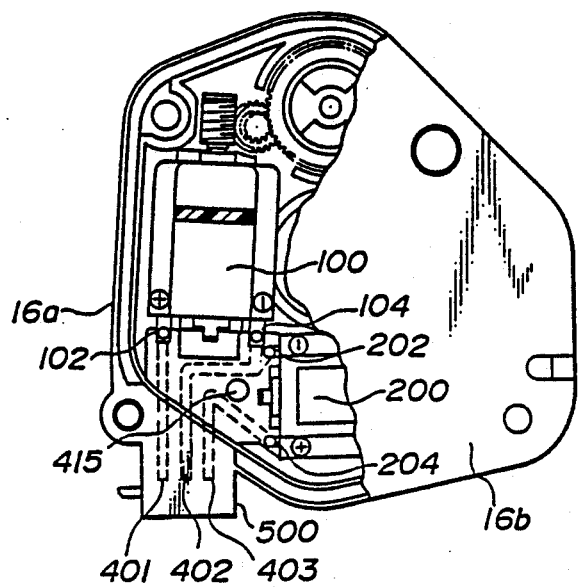
FIG. 7 is a plan view showing another embodiment of the mirror drive for remote-controlled rear-view mirror according to the present invention, showing one of the casings as partially fragmented.
Figure 8A:
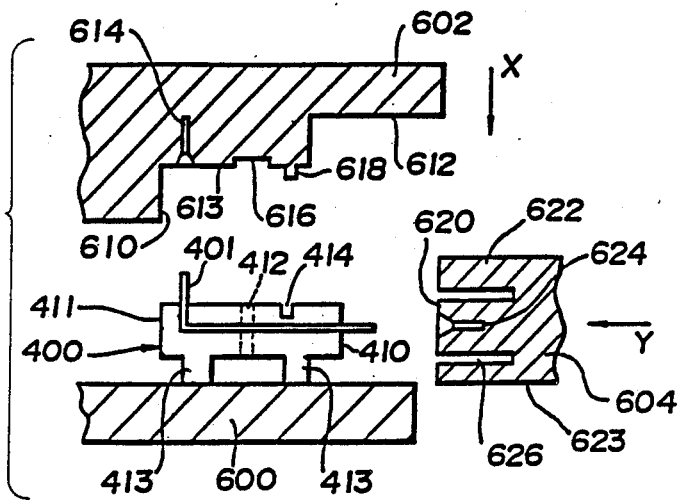
FIGS. 8 (a) to (c) are explanatory drawings showing the processes, respectively, of integrally burying, in the molding process of the casings, the plural conductive plates into the insulative block.
Figure 8B:
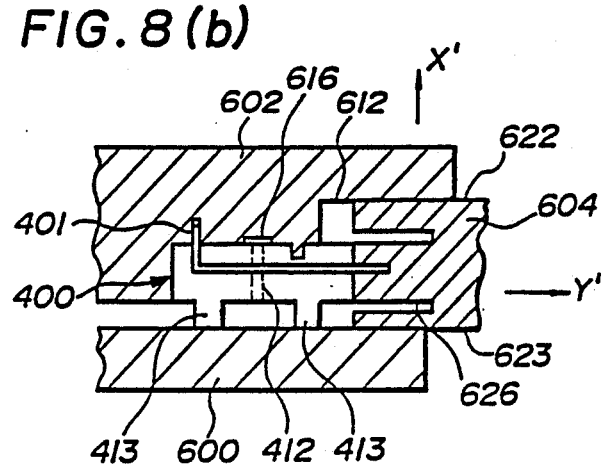
Figure 8C:
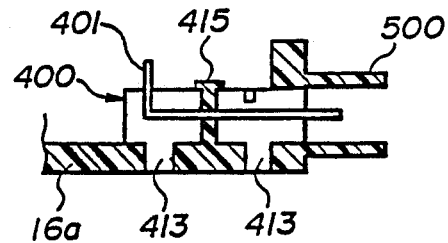

FIGS. 7 and 8 (a) to (c) show another embodiment of the present invention. In these Figures, the same or similar elements as in the first embodiment are indicated with the same or similar reference numerals. In this second embodiment, the insulative block 400 is molded integrally with the casing 16a in the molding process of the casing 16a. FIG. 7 is a partially fragmental rear view of the drive unit, and FIGS. 8 (a) to (c) are explanatory drawings generally showing the molding processes of the casing 16a.

Referring now to FIGS. 8 (a) to (c), a further explanation will be made below. In Figures, one of the three conductive plates 401, 402 and 403, namely, only the conductive plate 401 is shown and the remainder is omitted because they are identical. Each conductive plate is buried in the insulative block 400, having disposed as projected vertically from the top of the insulative block 400 the end thereof connected to the terminal of each motor and also having disposed as projected horizontally from the end face 410 of the insulative block the other end connected to the external connector. The insulative block 400 has formed on the bottom thereof a small cylindrical foot 413 projecting vertically downward and also it has formed therein a through-hole 412 open at the top and bottom thereof. Further, the insulative block 400 has a plurality of small holes formed in the top thereof. The insulative block 400 is disposed with the foot 413 thereof being in contact with the stationary mold 600. As shown in FIG. 8 (a), the insulative block 400 holds itself in place by moving the movable molds 602 and 604 over a predetermined distance in the directions of arrows X and Y. More particularly, the movable mold 602 has a vertical face 610 which is in contact with the end face 411 of the insulative block 400 and a horizontal face 613 which is in contact with the top of the insulative block 400. Furthermore, there is formed in the horizontal face 613 a recess 614 in which inserted is the end of each conductive plate which is to be connected to the terminal of each motor. Also there is formed in a position corresponding to the through-hole 412 a concavity 616 having a somewhat larger area than the opening area of the through-hole 412, and in the positions corresponding to the plural small holes 618 protrusions 618 which are to be fitted into the small holes 414. The movable mold 604 has a vertical face 620 which is in contact with the end face 410 of the insulative block 400 and horizontal faces 622 and 623 which are in contact with the surface of the stationary mold 602 and the horizontal face 612 of the movable mold 602, respectively. The vertical face 620 has formed therein a horizontal recess 624 in which the end of each conductive plate which is to be connected to the external connector 300, and a recess 626 which forms a socket 500. The recesses 614 and 620 formed in the movable molds 602 and 604, respectively, are provided primarily for housing the end of each conductive plate, and their openings are tapered for easiness of inserting the end of each conductive plate. For retention of the insulative block 400 in place, the vertical position of the insulative block 400 is determined as the horizontal face 613 of the movable mold 602 appropriately presses the top of the insulative block 500 on the stationary mold 600, while the horizontal position of the insulative block 400 is determined as the vertical face 620 of the movable mold 604 appropriately presses the end face 410 of the insulative block 400 with the end face 411 of the insulative block 400 being in contact with the vertical face 610 of the movable mold 602 and with the plural protrusions 618 formed on the movable mold 602 being fitted in the plural small holes 414 formed in the insulative block 400. This condition is shown in FIG. 8 (b). In this condition, a synthetic resin is injected into a space defined by the molds and insulative block 400 and thereafter it is hardened. It is obvious to those skilled in the art that after the synthetic resin is hardened, the movable molds 602 and 604 are removed as moved in the directions of arrows X' and Y' and thus the insulative block 400 is formed integrally with the casing 16a as schematically shown in FIG. 8 (c). The reference numeral 415 indicates a protrusion formed on the top of the insulative block 400 as the result of the injection and hardening of the synthetic resin in a space defined by the through-hole 412 in the insulative block 400 and the concavity 616 in the movable mold 602. This protrusion 415 ensures the integrity of the insulative block 400 with the casing 16a.

In the embodiment having been described just in the foregoing, the conventional positioning of the insulative block 400 by inserting the ends of each conductive plate into the recesses provided in the stationary and movable molds is not required, but the molding yield of the casing 16a is improved since the insulative block 400 itself is positioned as pressed by the molds. The recesses 624 and 614 formed in the movable molds 602 and 604, respectively, are provided primarily for housing the ends of the insulative plates. As the exposed ends of the conductive plates are so arranged against any direct contact with the injected synthetic resin, the synthetic resin does not reside on the exposed ends of the conductive plates, thus the connection with the external connector will not adversely be affected.

In the aforementioned two embodiments, the terminals of the motors are connected with the ends of the conductive plates which are exposed from the end of the insulative block, by a simple mechanical contact. By soldering these contact portions, a more secure connection can be attained. Also it will be evident to those skilled in the art that for forward run of the motor 100, the conductive plate 401 is connected to the positive pole of the battery and the conductive plates 402 and 403 are connected to the negative pole, while for reverse run of the motor 100, the conductive plate 401 is connected to the negative pole of the battery and the conductive plates 402 and 403 are connected to the positive pole, and that for forward run of the motor 200, the conductive plate 403 is connected to the positive pole of the battery and the conductive plates 401 and 402 are connected to the negative pole, while for reverse run of the motor 200, the conductive plate 403 is connected to the negative pole of the battery and the conductive plates 401 and 402 are connected to the positive pole.

What is claimed is:

1. A mirror drive for use in a remote-controlled rearview mirror assembly, comprising:
    two motors to drive the horizontal and vertical turns of a mirror pivotably supported in a mirror housing;
    an airtight container housing said two motors and consisting of two synthetic resin-made casings which are closely attached to each other;
    gear means disposed in said airtight container and which decelerate the rotation of the output shafts of said two motors;
    means engaged with said gear means to convert the rotary motion of the gear means into a substantial linear motion and also projected out of said airtight container to transmit said linear motion to said mirror; and
    means for electrically connecting terminals of said two motors to external connectors outside said airtight container,
    said electrical connecting means being composed of an insulative block secured to the lateral wall of either of said casings of said airtight container and which covers an opening formed in the lateral wall, and a plurality of electrically conductive plates previously buried in said insulative block, each being at one end thereof electrically connected to a corresponding terminal of said two motors while the other end is led out through said opening formed in said casing.

2. A mirror drive for use in a remote-controlled rearview mirror assembly according claim 1, said insulative block in which said plural conductive plates are previously buried being integrally buried in said casings in the molding process of said casings.

3. A mirror drive for use in a remote-controlled rearview mirror assembly according claim 2, wherein said insulative block has a generally horizontal bottom and top and generally vertical sides, the one end of each of said conductive plates which is to be connected to each terminal of said two motors being projected vertically from said top of said insulative block while the other end led out from the opening of said casing is projected horizontally from said side of said insulative block.

4. A mirror drive for use in a remote-controlled rearview mirror assembly according claim 1, wherein said insulative block in which said plural conductive plates are previously buried covers the opening in the lateral wall of said casings and is secured to said lateral wall by means of an adhesive.

5. A mirror drive for use in a remote-controlled rearview mirror assembly according claim 4, wherein said insulative block has a small positioning hole formed therein and said casing has formed vertically at a predetermined position on the inner wall thereof a pin which is engageable in said small hole.

6. A mirror drive for use in a remote-controlled rearview mirror assembly according claim 1, wherein one end of each of said conductive plates is so shaped as to be engageable in a small hole formed in each terminal of said two motors.

* * * * *